United States Patent [19]

Chen

[11] Patent Number: 5,193,879
[45] Date of Patent: Mar. 16, 1993

[54] CHASSIS FOR CHILD'S ELECTRIC CARS

[76] Inventor: Yea R. Chen, No. 7, Alley 6, Lane 170, Chou Kung Street, Yung Kang Hsiang, Tainan Hsien, Taiwan

[21] Appl. No.: 804,412

[22] Filed: Dec. 10, 1991

[51] Int. Cl.⁵ ............................................. B62D 25/20
[52] U.S. Cl. .................................. 296/177; 296/204; 296/208; 280/797; 180/65.1; 180/60; 180/311
[58] Field of Search ........................ 296/177, 204, 208; 280/782, 783, 797, 12.13; 180/60, 65.1, 311, 312; D12/152; D21/78

[56] References Cited

U.S. PATENT DOCUMENTS 4,988,143  1/1991  Harrod ............................... 296/177

FOREIGN PATENT DOCUMENTS 731074  6/1955  United Kingdom ................ 296/177

OTHER PUBLICATIONS

Popular Science, Apr. 1960, p. 106, "Tiny Racer Has Unit Frame".

Primary Examiner—Dennis H. Pedder
Attorney, Agent, or Firm—Bacon & Thomas

[57] ABSTRACT

A chassis for a child's electric car formed as one unit comprising a front portion, a middle portion and a rear portion, the front portion having a rectangular plate extending to the front and provided with chambers for lodging a battery to power a motor and a musical IC chip and a control plate behind the rectangular plate provided with a hole for fixing a steering wheel unit and a lateral groove in the bottom for placing a front wheel shaft, the middle portion having a foot plate to support two legs of a driver and the rear porton having four compartments, a lateral elongate groove for placing a rear wheel shaft, a lengthwise groove for laying electric wires and an extra compartment for lodging a motor to drive the wheels.

1 Claim, 4 Drawing Sheets

CHASSIS FOR CHILD'S ELECTRIC CARS

BACKGROUND OF THE INVENTION

A conventional child's electric car shown in FIGS. 1-4 comprises a chassis 10 having a reinforcing rod 11 separating a bottom plate 12 into halves. A plurality of reinforcing ribs 121 are provided on the bottom plate 12 to strengthen the plate 12 to endure more load, and an opening 111 is provided near the front end of the reinforcing rod 11 to fix an accelerator pedal therein. An elongate lateral groove 13 is provided at the front portion of the chassis 10 for positioning a front wheel shaft 131 to combine front wheels 14 with, and a triangular hole is provided below the middle of the groove 13 for fixing a steering wheel shaft 151 and a connecting rod 16 is connected with the steering wheel shaft 151 and the front wheel shaft 131 so that the front wheels can be driven. A battery 17 is put above the center of the groove 13 to supply and charge electric power for a motor 18. A U-shaped linking rod 19 is provided on the rear portion of the chassis 10, fixed firmly with the body 20. In addition, a reinforcing bar 22 formed as a unit is provided along the opposite sides of the chassis and the opposite inner sides of the body 20 and extending symmetrically to the front and the rear of the chassis and is firmly connected with the U-shaped bumpers 21 as one unit. A seat 23 is screwed on the rear portion of the chassis 10 and a portion plate 24 is provided below the seat 23, fixed under the reinforcing bar 22 as as to position the rear wheel shaft 251 and the rear wheels. Then a motor 18 is fixed and necessary wiring is done, finishing the electric car.

The conventional child's electric car is considered to have the following drawbacks.

1. The chassis 10 has the accelerator pedal, the front wheel shaft 131, the front wheels 14, the steering wheel shaft 151 and the battery fixed thereon, so the rear wheels 25 and the motor 19 have to be fixed on the position plate 24 additionally provided, to a resultant complicated structure to involve much extra work and cost.

2. All the electric wires are placed along the inner wall without protective covering, liable to be harmed and fall off, not easy to lay them as well.

3. The chassis 10 is formed of plastic by means of injecting molding process, but the rest components such as reinforcing bar 22, the position plate 24, the U-shaped linking rod 19 are made of metal by means of pressing process, and their manufacturing process is rather complicated.

4. The chassis 10 is supported with the connecting rod 16, the reinforcing bar 22 and the linking rod 19, the rear wheels 25 is supported with the position plate 24 and reinforcing bar 22, and there are a lot of connecting points to be screwed or welded, to a resultant laborious assembling work.

5. The chassis has to be often turned upside down to assemble components, detrimental to a production flow line and not effective.

SUMMARY OF THE INVENTION

The chassis in the present invention has been planned to have the following advantages.

1. The whole chassis is formed as one unit, simplified in its manufacturing process.

2. Almost all the components are combined with the chassis by placing and fixed on the upper surface of the chassis, speeding up its assemblage and saving time and labor.

3. Groove ways are provided in the bottom for the chassis for laying and protecting all the electric wires therein, facilicating wiring work.

4. It is not needed to turn upside down the chassis in assembling the components with the chassis, elevating productivity more than that of a conventional child's electric car.

DETAILED DESCRIPTION OF THE INVENTION

The chassis for a child's electric car in the present invention, as shown in FIGS. 5-8, comprises three main portions, a front portion 30, a middle portion 40 and a rear portion 50 formed as one unit with injecting molding process.

Figure 1:
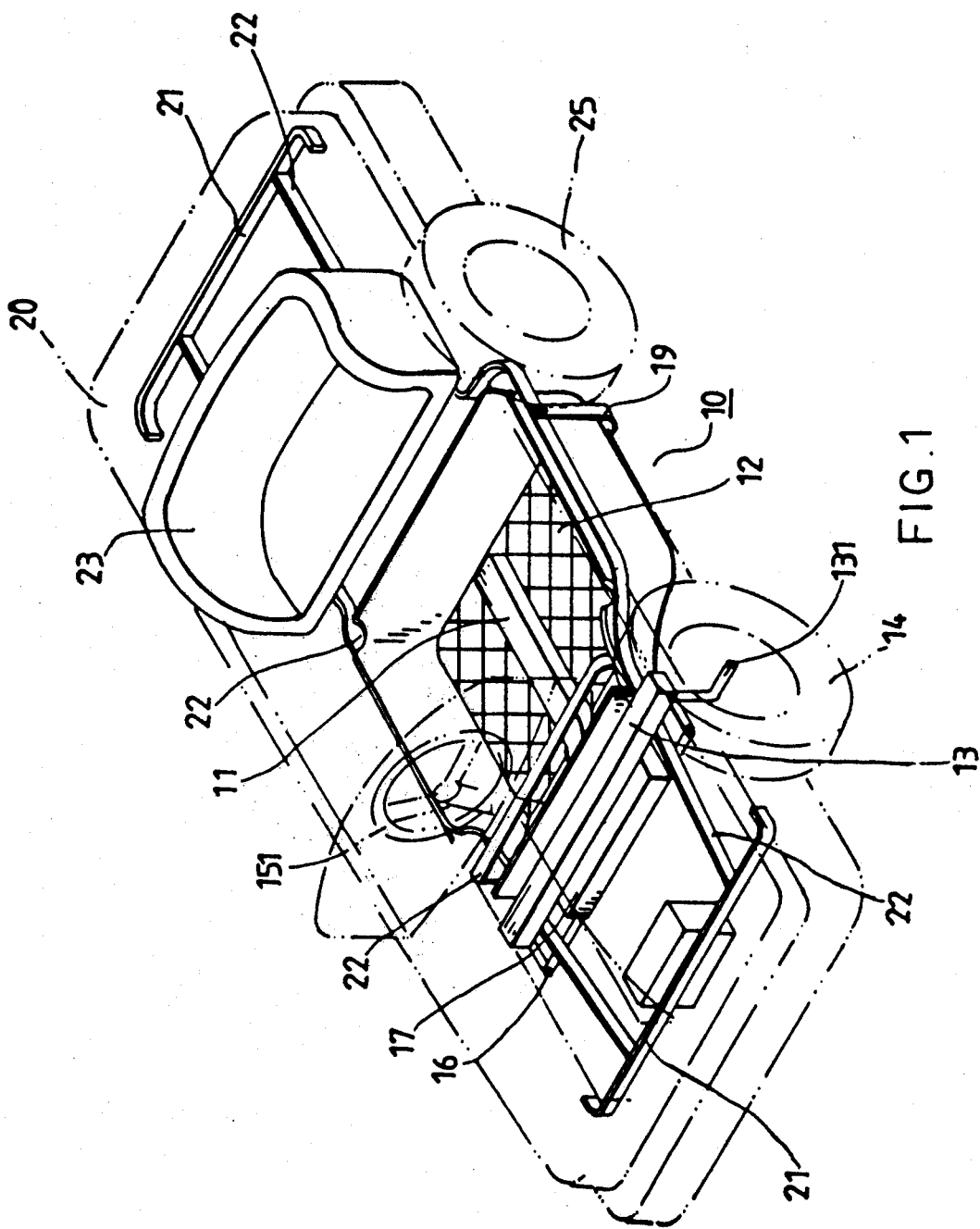
FIG. 1 is a perspective view of a conventional child's electric car.
Figure 2:
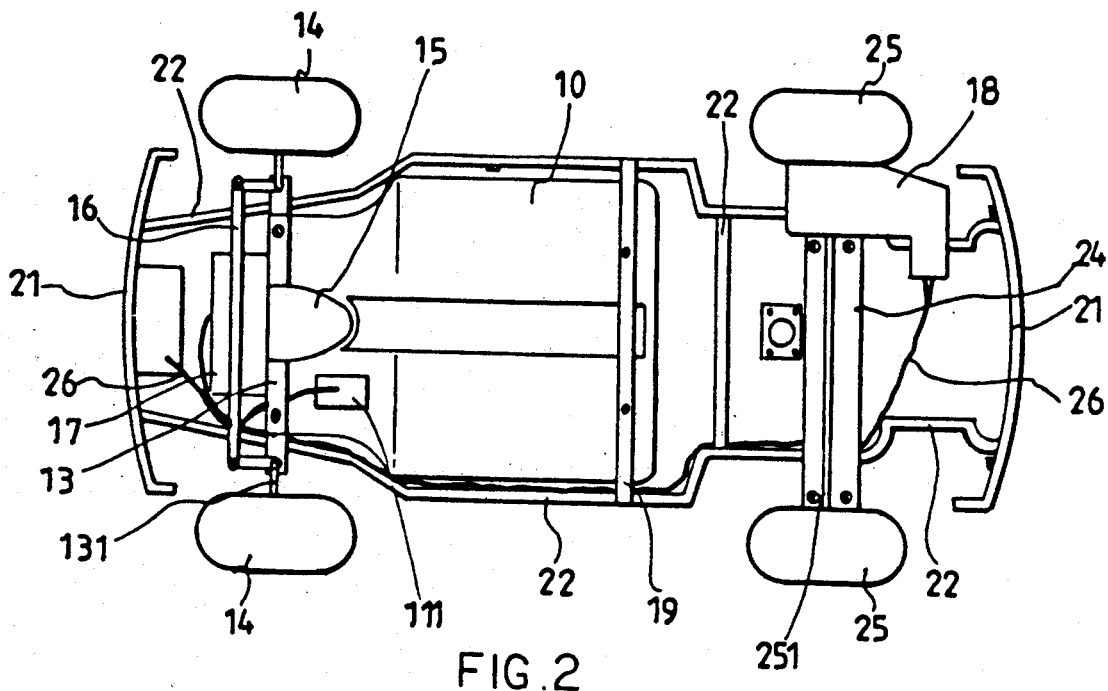
FIG. 2 is a upside view of a conventional child's electric car.
Figure 3:
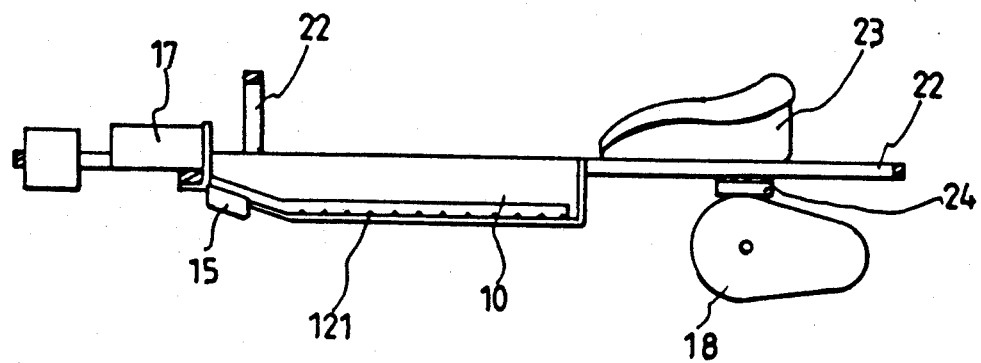
FIG. 3 is a side cross-sectional view of a conventional child's electric car.
Figure 4:
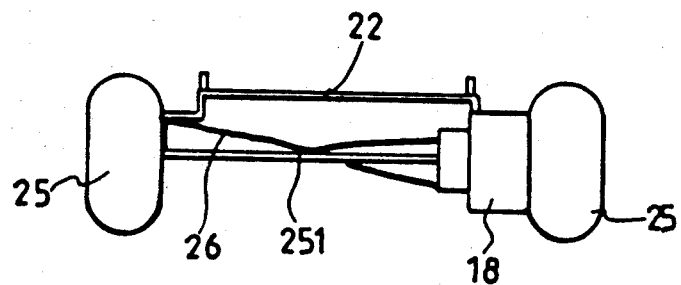
FIG. 4 is a part cross-sectional view of a conventional child's electric car.
Figure 5:
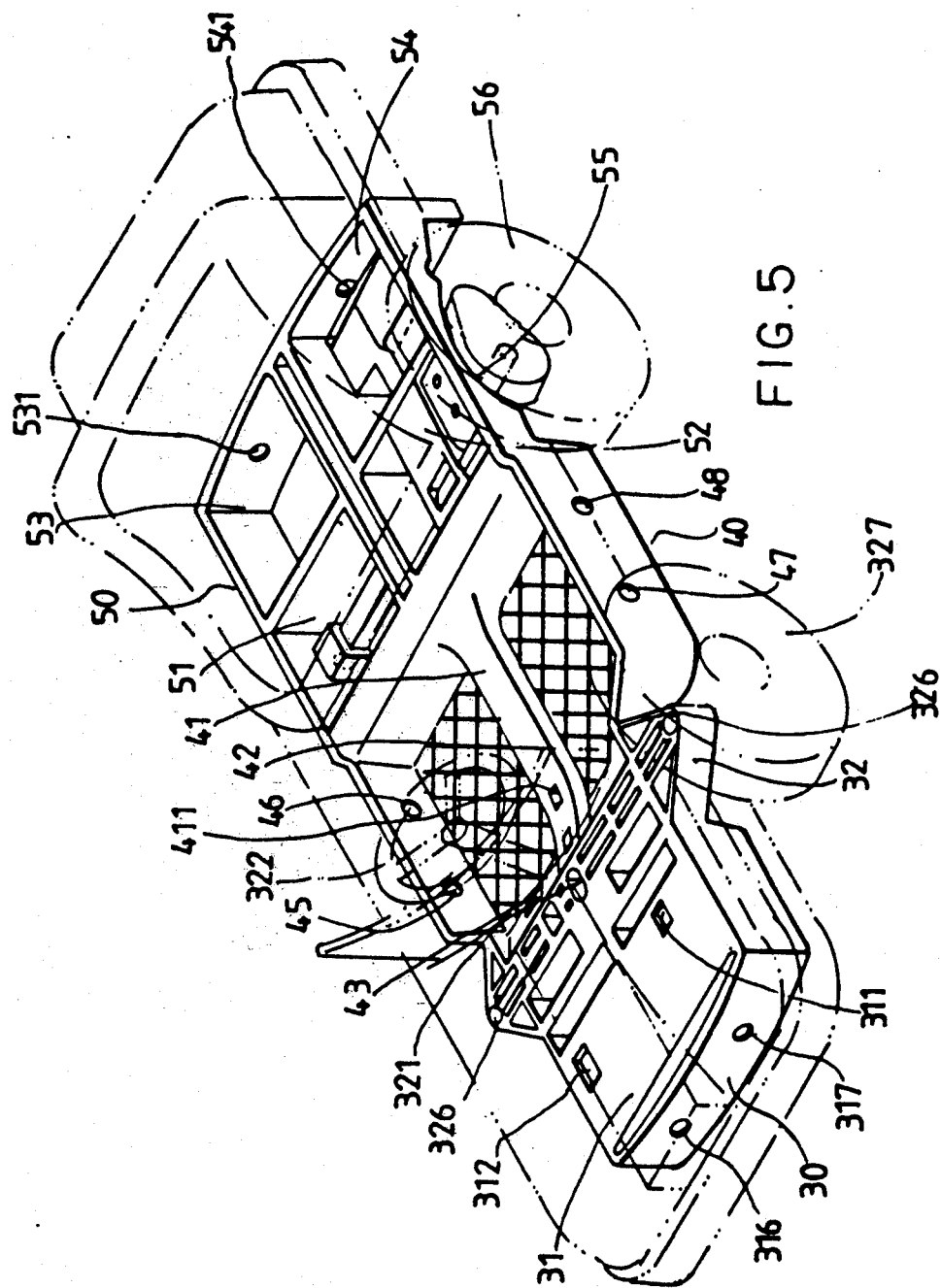
FIG. 5 is a perspective view of the chassis for a child's electric car in the present invention.
Figure 6:
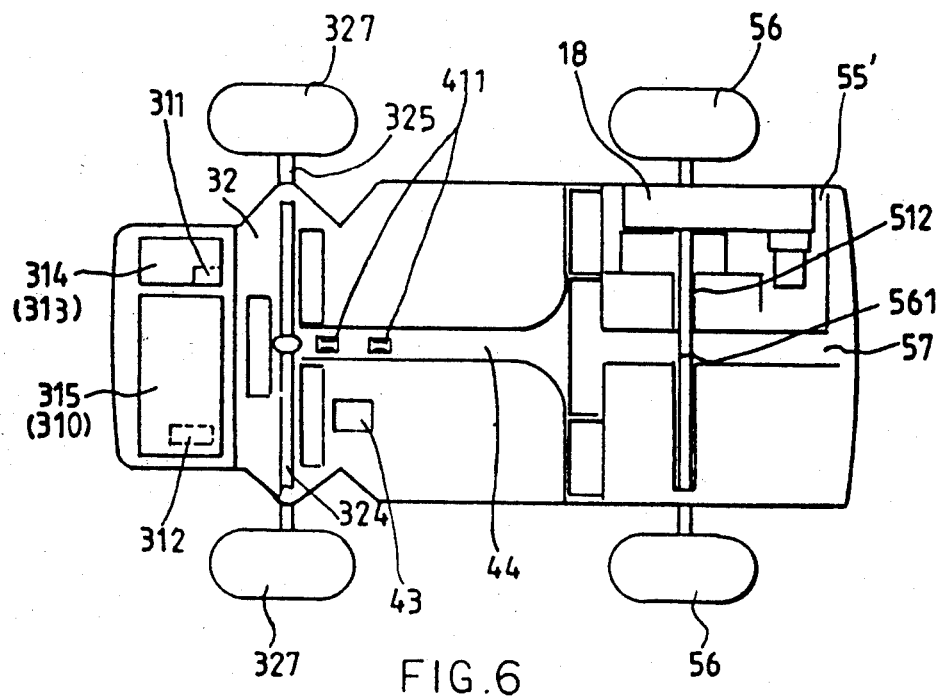
FIG. 6 is an upside view of the chassis for a child's electric car in the present invention.

The front portion consists of a rectangular plate 31 and a control plate 32 behind the rectangular plate 31, said rectangular plate 31 extending to the front and bored with rectangular holes 311, 312, and having a small chamber 314 and a large chamber 315 extending downward shown in FIG. 6. The chamber 314 under the hole 311 is for lodging a battery 313 and the chamber 315 for lodging a musical IC chip 310. The front vertical side of the plate 31 is provided with two round holes 316, 317 to combine a car body with screws. The control plate 32 is provided with a triangular projection on the opposite sides and a central round hole 321 for fixing a steering wheel unit 322 and a lateral long groove 324 under the hole 321 for a front wheel shaft 325 to lie therein, a round hole 326 respectively in the triangular top for the front wheel shaft 325 to extend out to combine front wheels 327 therewith.

The middle portion formed as a foot plate is provided with a lengthwise central slightly-curved rod 41, a bottom plate 42 divided by the rod 41 into two symmetrical halves, reinforcing ribs 421 fixed with the bottom plate 42, a square recessed cavity 43 in the front portion for fixing an accelerator pedal, four round holes 45, 46, 47, 48 in both opposite sides equally spaced apart for combining the car body with the chassis with screws, and the rod 41 has an empty interior 44 for electric wires to extend through and two grooves 411 on its upper surface.

Figure 7:
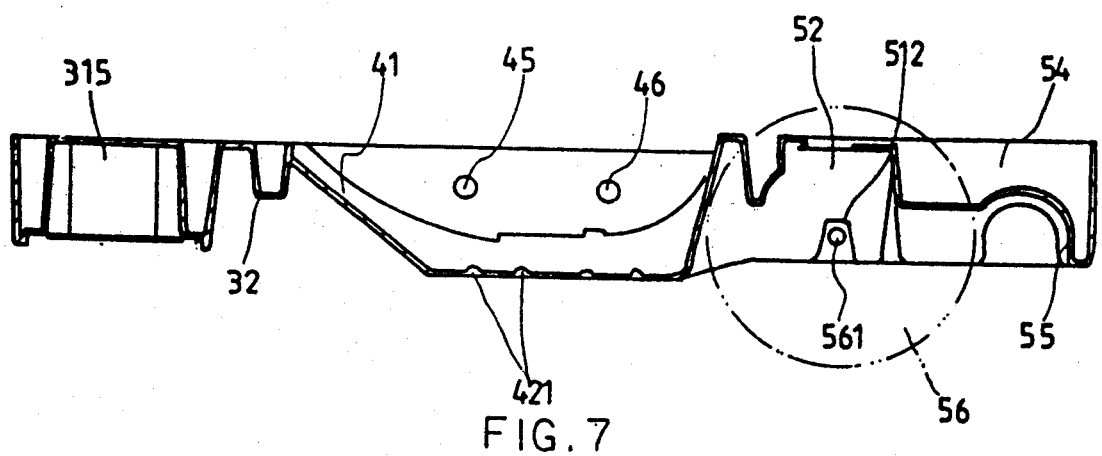
FIG. 7 is a side cross-sectional view of the chassis for a child's electric car in the present invention.
Figure 8:
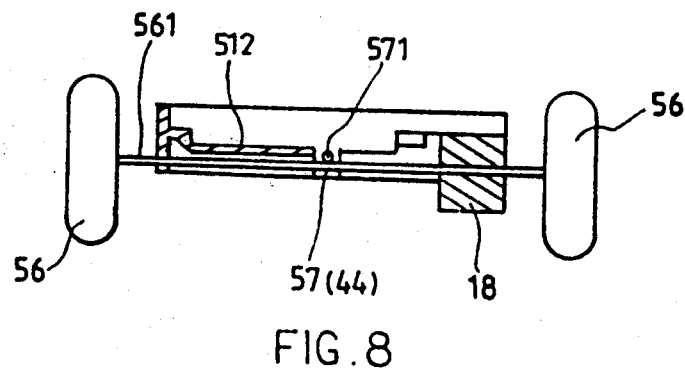
FIG. 8 is a part cross-sectional view of the chassis for a child's electric car in the present invention.

The rear portion 50 is provided with four compartments 51, 52, 53, 54 of different sizes, a long lateral groove 512 under the compartments 51, 52 for a rear wheel shaft 561 to lie therein for combining rear wheels 56, an irregularly curved surface 55 in one side as shown in FIG. 7, and an extra compartment 55' under the surface 55 for lodging a motor, a groove way 57 in the central bottom communicating with the empty interior 44 of the lengthwise rod 41 for placing wires 571 as shown in FIG. 8, and round holes 531, 541 in the rear sides of the compartments 53, 54 for assembling firmly the car body together with the chassis by means of the round holes 316, 317 with screws.

The front portion 30, the middle portion 40, and the rear portion are formed as one unit, and all the components related to the electric equipment are assembled and connected on the bottom of the chassis. For example, the battery 313 is lodged in the chamber 314, and the musical IC chip 310 in the chamber 315, and those chambers can be closed with a cap to stabilize the contents therein. The central round hole 321 is for fixing the steering wheel unit therein, the long lateral groove 324 and the round holes 326 are for the front wheel shaft to position therein and then to combine with the front wheels. The accelerator pedal 431 is to be fixed in the recessed cavity 43 in the middle portion 40, the motor in the extra compartment 55', the rear wheel shaft in the lateral groove 57, and all the electric wires in the interior 44 of the rod 41 and the groove way 57. Then the body and the chassis are combined together with eight screws fitted in the eight holes in the chassis.

What is claimed is:

1. A chassis for a child's electric car comprising; a front portion having a rectangular plate extending to the front and a control plate behind the rectangular plate, said rectangular plate provided with two chambers for lodging a battery and a musical IC chip, at least one hole on each of the respective chambers, and two screw holes in a front vertical side of the rectangular plate for screws to combine the chassis with a body, said control plate having (1) a central round hole for a steering wheel unit to be fixed therein, (2) a triangular part projecting out from the opposite sides, (3) a lateral elongate groove under the central round hole for supporting a front wheel shaft, and (4) a round hole respectively in the top of the triangular part for the front wheel shaft to extend out for combining front wheels with the front wheel shaft;

a middle portion having a foot plate divided into two symmetrical halves by a lengthwise slightly-curved rod and strengthened with reinforcing ribs for supporting two legs of a child using this car, having a recessed cavity in the front portion for fixing an accelerator pedal, round holes in the two opposite sides for screwing the car body with the chassis, and said lengthwise rod having an empty interior for electric wires to extend therein; and a rear portion having (1) four compartments, (2) an elongate lateral groove under the bottom of two of the compartments for placing a rear wheel shaft, (3) a lengthwise groove communicating with the interior of the lengthwise rod in the middle portion for placing electric wires, (4) a screw hole in a vertical rear side of the other two of said compartments for assembling the body with the chassis.

* * * * *